(12) United States Patent
Martin et al.

(10) Patent No.: US 6,298,038 B1
(45) Date of Patent: *Oct. 2, 2001

(54) TRANSPARENT TRANSPORT

(75) Inventors: David Wright Martin, Nepean; Mohammed Ismael Tatar; Alan Glen Solheim, both of Kanata; Timothy James Armstrong, Stittsville; Mark Stephen Wight, Ottawa; Ronald J. Gagnon, Nepean; David John Nicholson, Ottawa, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 08/847,529

(22) Filed: Apr. 24, 1997

(51) Int. Cl.$^7$ ........................................ H04J 1/16
(52) U.S. Cl. ............................. 370/216; 370/535
(58) Field of Search .................. 370/242, 535, 370/516, 517, 537, 538, 539, 907, 542, 543, 522, 215, 216, 217, 219, 222, 224, 225

(56) References Cited

U.S. PATENT DOCUMENTS

| | | | |
|---|---|---|---|
| 5,216,666 | * 6/1993 | Stalick | 370/16.1 |
| 5,283,785 | * 2/1994 | Ferguson | 370/55 |
| 5,434,858 | * 7/1995 | Shimada | 370/68.1 |
| 5,436,890 | * 7/1995 | Read et al. | 370/58.2 |
| 5,579,323 | * 11/1996 | Krisher | 370/99 |
| 5,583,855 | * 12/1996 | Ball | 370/376 |
| 5,675,580 | * 10/1997 | Lyon et al. | 370/250 |
| 5,841,760 | * 11/1998 | Martin et al. | 370/242 |
| 5,884,017 | * 3/1999 | Fee | 395/182.02 |
| 5,896,378 | * 4/1999 | Barker | 370/384 |
| 5,905,731 | * 5/1999 | Barker | 370/476 |

* cited by examiner

Primary Examiner—Melvin Marcelo
Assistant Examiner—Chiho Andrew Lee
(74) Attorney, Agent, or Firm—Aprilia U. Diaconescu

(57) ABSTRACT

A configuration for a transport node of a telecommunication system comprises a pair of transparent mux/demuxs provided at two sites and connected over a high rate span. The T-Muxs provide continuity of all tribs and maintain a lower bit rate linear or ring system through the higher bit rate span. The lower bit rate linear or ring system operates as if it were directly connected without the higher bit rate midsection. For the forward direction of the traffic, the T-Mux comprises a multi-channel receiver for receiving a the trib signals and providing for each trib signal a trib data signal and a trib OAM&P signal. The data signals are multiplexed into a supercarrier data signal and the OAM&P signals are processed to generate a supercarrier OAM&P signal. A supercarrier transmitter maps the supercarrier data signal and the supercarrier OAM&P signal into a supercarrier signal and transmits same over the high rate span. Reverse operations are effected for the reverse direction of traffic. With this invention, an entire ring system does not have to be upgraded to a higher line rate due to fiber exhaust on a single span. The invention is particularly applicable to SONET OC-48/OC-12/OC-3 linear and ring networks and the high rate span could be an OC-192 line.

18 Claims, 6 Drawing Sheets

TRANSPARENT TRANSPORT

BACKGROUND OF THE INVENTION

1. Field of the Invention

This invention is directed to a configuration for a transport node of a telecommunication system, and more particularly, to a transparent multiplexer for telecommunication systems.

2. Background Art

Telecommunications network providers are feeling the pressure of modern technologies as users demand ever more capacity. That factor, along with the reality of fiber congestion in the network, is causing service providers to search for a solution that will increase capacity without forcing them to deploy additional fibers. At the moment, two practical solutions exist: using wavelength division multiplexing (WDM) to combine multiple wavelengths on one set of fibers, or using a higher bit rate, time division multiplexing (TDM) systems.

Both solutions are viable, but each has disadvantages for certain applications. Linear systems have a different solution than rings, short spans have a different solution than long spans in each type of network, and even rings will have different solutions from one another, depending on the number of the nodes and the span lengths between the nodes.

In practice, there are many benefits to large bandwidths on a single SONET network element, especially in ring topologies. Network management can be simplified by reducing the number of network elements (NE). This also reduces the amount of equipment in the network, which means fewer trips to a location for equipment repairs and replacement.

For an existing linear system that is experiencing fiber exhaust on a given span, the traditional solution is to replace the relevant terminals to obtain a higher line rate system. However, for a ring configuration, the line rate of the entire ring must be upgraded even if only one span is short of fiber. It is thus easy to understand why some network providers are asking for other options.

SUMMARY OF INVENTION

Transparent transport is defined as the ability to provide continuity of all payloads and associated overhead bytes necessary to maintain a lower bit rate linear or ring system through a higher bit rate midsection. The lower bit rate linear or ring system shall operate as if it were directly connected without the higher bit rate midsection.

It is an object of the present invention to provide a configuration for a telecommunication system and a method for addressing the fiber exhaust on a per span basis, without having to replace the equipment of all tributary (trib) systems. With this invention, an entire ring system does not have to be upgraded to a higher line rate due to fiber exhaust on a single span. The invention is particularly applicable to OC-48 rings, although lower rates rings, such as OC-12 and OC-3 may also be upgraded, as well as higher rates, when available.

It is another object of the present invention to provide a configuration for a telecommunication system that permits tributary channels to be carried transparently over a high rate line, with no change in provisioning of tributary systems. For example, the tributaries may be OC-48/OC-12/OC-3 lines and the high rate line could be an OC-192 line.

Still another object of this invention is to provide a supercarrier for transporting a plurality of trib systems over a midsection of a network. This is obtained by provisioning a pair of transparent multiplexer/demultiplexers (TMuxs) at the ends of the midsection, which manipulate the tribs such as to maintain the protection switching, to effect line maintenance signalling, section/line/path performance monitoring, and to provide sufficient performance information for fault isolation.

Accordingly, the invention comprises a method for transporting a plurality (K) of trib signals over a high rate span, comprising the steps of connecting a plurality (K) of trib input ports to a like plurality (K) of trib networks, each trib input port for receiving a trib input signal from a corresponding trib network over a trib channel, transparently multiplexing all the trib input signals into a supercarrier signal, the supercarrier signal comprising operation, administration, maintenance and provisioning (OAM&P) information on all the trib input signals and OAM&P information on the supercarrier signal, and connecting a supercarrier output port to the high bit rate span for transmitting the supercarrier signal.

The invention further comprises a method for transporting a plurality (K) of trib signals over a high bit rate span, comprising the steps of connecting a supercarrier input port to the high rate span for receiving a supercarrier signal over a supercarrier channel, transparently demultiplexing the supercarrier signal into a plurality (K) of trib output signals, each the trib output signal comprising OAM&P information on the trib output signal and OAM&P information on the supercarrier signal, and connecting a plurality (K) of trib output ports to a like plurality of trib networks, each trib output for transmitting a trib output signal over a corresponding trib channel.

Further, in a plurality (K) of tributary networks, each trib network for transporting trib signals between a multitude of sites with protection switching capabilities, the trib networks having in common a first and a second site, a method for carrying all the trib signals between the first and the second site over a high rate span, with no change to the provisioning of the trib networks, the method comprising, at any of the first or the second site, the steps of providing a like plurality (K) of trib ports and connecting each the trib port to a corresponding trib network over an associated FW trib channel, an associated FP trib channel, an associated RW trib channel and an associated RP trib channel, providing a supercarrier port and connecting same to the high rate span over a FW, a FP, a RW and a RP supercarrier channel, receiving at each trib port, from the corresponding trib network, a FW trib signal over the associated FW trib channel, and a FP trib signal over the associated FP trib channel, transparently multiplexing all the FW trib signals into a FW supercarrier signal comprising OAM&P information on all the FW trib signals and OAM&P information on the FW supercarrier signal, and transparently multiplexing all the FP trib signals into a FP supercarrier signal comprising OAM&P information on all the FP trib signals and OAM&P information on the FP supercarrier signal. The invention further comprises the steps of at the supercarrier port, transmitting the FW supercarrier signal over the FW supercarrier channel and transmitting the FP supercarrier signal over the FP supercarrier channel.

The invention further comprises a transparent multiplexer/demultiplexer (T-Mux) for a telecommunication system, comprising a multi-channel receiver for receiving a plurality (K) of trib input signals, each from an associated trib network, delineating each the trib input signal into a trib data signal and a trib OAM&P signal, means for multiplexing all the trib data signals into a supercarrier data signal, means for processing all the trib OAM&P signals and generating a supercarrier OAM&P signal, and a supercarrier transmitter for mapping the supercarrier data signal and the supercarrier OAM&P signal into an output supercarrier signal of a high bit rate, and transmitting same over a high rate span.

Further, a transparent multiplexer/demultiplexer (T-Mux) for a telecommunication system comprises a supercarrier receiver for receiving a supercarrier signal of a high bit rate over a high rate span channel and delineating same into a supercarrier data signal and a supercarrier OAM&P signal, means for demultiplexing the supercarrier data signal into a plurality (K) of trib data signals, means for processing the supercarrier OAM&P signal into a like plurality (K) of trib OAM&P signals, and a multi-channel transmitter for mapping each of the trib data signals and a corresponding one of the trib OAM&P signals into a trib signal and transmitting each the trib signal to an associated trib network.

A basic advantage of this invention is per span relief for fiber exhaust where no changes to existing systems is desired.

Another advantage is that a pair of TMuxs at the sites connected by the high line rate span may be a less expensive solution than the WDM approach for some network applications. For example, only one OC-192 electrical repeater is needed on the high rate span according to the invention, while four electrical repeaters are necessary in the WDM approach. The cost of four OC-48 repeaters is about 1.6 times the cost of one OC-192 repeater.

In addition, the WDM approach to accommodate higher rates on an existing network requires replacing the initially installed transmitters with a set of wavelength-specific (e.g. 1533 nm, 1541 nm, 1549 and 1557 nm) transmitters, adding to the overall cost of the up-grade.

Another advantage of the transparency is that there are no potential mid-span meet problems with the TMux-trib system interface regarding protection or data communication protocols which may be the case for conventional Mux/trib system interfaces.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1:
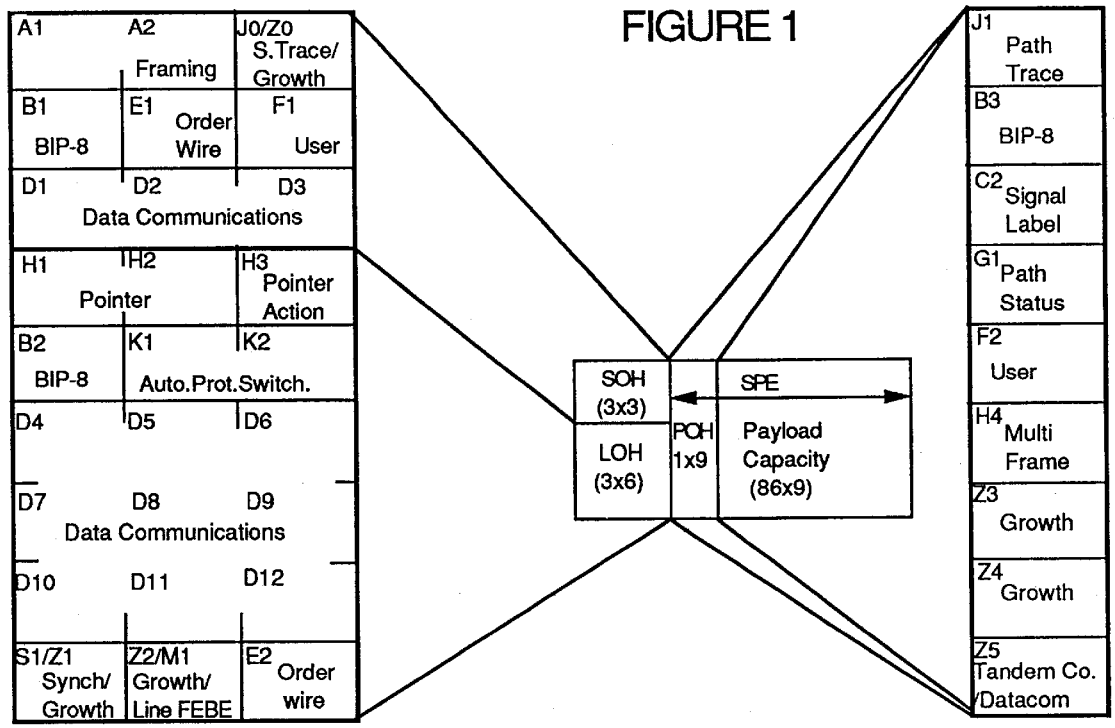
FIG. 1 is a diagram of the byte allocation in the transport overhead (TOH) according to the SONET standard.

The necessary background and terms used herein are provided in the following in connection with FIG. 1, which is a diagram showing the byte allocation in the transport overhead (TOH) according to the synchronous optical network (SONET) standard.

The SONET standards ANSI T1.105 and Bellcore GR-253-CORE, define the physical interface, optical line rates known as optical carrier (OC) signals, a frame format, and an operation, administration, maintenance and provisioning (OAM&P) protocol. The user signals are converted into a standard electrical format called the synchronous transport signal (STS), which is the equivalent of the optical signal. The STS-1 frame consists of 90 columns by 9 rows of bytes, the frame length is 125 microseconds. As such, STS-1 has a rate of 51.840 Mb/s. Higher rates (STS-N, STS-Nc) are built from this one, and lower rates are subsets of this. The add/drop multiplexer multiplexes various STS-N input streams onto optical fiber channels.

A SONET frame comprises a transport overhead (TOH) consisting of three columns and 9 rows, and a synchronous payload envelope (SPE) comprising an 87 columns, one column for the path overhead (POH) and 86 columns for the payload. The TOH includes a section overhead field (SOH) consisting of three columns and three rows (3×3), and a line overhead (LOH) field consisting of three columns and six rows (3×6).

The section layer deals with the transport of multiplexed signals across the physical medium. A section is a portion of the transmission facility between two section terminating equipments (STE), such as regenerators and terminals.

The SOH includes framing bytes A1, A2, which consist of a unique bit sequence indicating the beginning of an STS-1 frame. Byte J0 is now used to physically identify the fibers and is present in the first STS-1 (STS-1 #1) of a STS-N signal, while byte Z0 represents an additional growth byte in all remaining STS-1s (STS-1 #2 to STS-1 #N). Section error monitoring byte B1 is used to determine if a transmission error has occurred over a section. Byte B1 is defined for STS-1 #1. A compounded bit interleaved parity (BIP-8) code is placed in the B1 byte of STS-1 before scrambling. Its value is an 8-bit code using even parity, calculated over all bits of the previous STS-N frame after scrambling.

Local orderwire (LOW) byte E1 provides a 64 Kb/s channel between section entities, and it is proposed as a voice channel for craftspersons and for communications between regenerators, hubs and remote terminal locations.

Byte F1 is the section user byte set aside for the network provider's purposes. It is passed from one section level entity to another and is terminated at all section level equipment. It can be read/written at each section terminating equipment, and is defined only for STS-1 #1.

The section data communication channel (DCC) bytes D1, D2 and D3 provide a 192 Kb/s data channel between section entities, which is used for alarms, controls, monitoring, administration, and other communication needs. It is available for internally generated, externally generated and manufacturer specific messages. These bytes are defined only for STS-1 #1.

The line layer, or multiplex section, of SONET standard provides synchronization and multiplexing for the path layer. A line is a portion of the transmission facility between two consecutive line terminating equipments (LTE), which could be add-drop multiplexers (ADM) or terminals (TM). An ADM multiplexes/demultiplexes signals into/from a higher rate signal. It accesses signals that need to be dropped or inserted at the ADM site, the rest of the traffic continuing straight through.

The LOH includes payload pointers H1, H2 used to specify the beginning of the synchronous payload envelope (SPE) within the frame. H1 and H2 are also used to accommodate frequency offsets between the received STS-N frame and the local system frame. As well, these bytes are used to indicate concatenation and STS-1 path alarm inhibit signal (AIS). Pointer H3 is defined for negative frequency justification, in which case it carries an extra SPE byte.

Byte B2 is for line error monitoring and is provided in all STS-1s signals in a STS-N. Its role is similar to that of byte B1. Automatic Protection Switching (APS) bytes K1 and K2 are used for signalling between line level entities for automatic protection switching, for indicating line Alarm Inhibit Signal (AIS) and Line Remote Defect Indicator (RDI). Line Data Communication Channel (DCC) bytes D4 to D12 provide a 576 Kb/s message channel between line entities for OAM&P information, available for internally generated, externally generated and manufacturer-specific messages.

Bytes S1/Z1 and Z2/M1 are defined depending on the position of the STS-1 in an STS-N signal. Thus, S1 is the synchronization message for STS-1 #1, and Z1 is a growth byte in STS-1 #2-48 of an STS-192. Byte M1 is used for a line layer far-end block error (FEBE) function in STS-1 #7 of a STS-N, while Z2 is the growth byte in STS-1 #1-6, and 8-48 of an STS-192. Finally, express orderwire (EOW) byte E2 provides a 64 Kb/s for use by craftpersons interconnecting only line entities.

The path layer of SONET deals with the transport of services, such as DS1 or DS3, between path terminating equipments (PTE). The main function of the path layer is to map the services and path overhead (POH) into STS-1s, which is the format required by the line layer.

Trace byte J1 is used to identify that the correct connection was made between the two end points of the path; it is a user programmable byte that repetitively transmits a 64-byte fixed length string so that a receiving terminal in a path can verify its continued connection to the intended transmitter. The path BIP-8 code, the B3 byte, uses even parity calculated over all bits of the previous STS-SPE before scrambling.

Signal label byte C2 is used to indicate the type of payload mapping and number of constituent failed virtual tributaries (VTs). Byte G1 is used to transmit path status information from the destination to the origination equipment, and permits the status and performance of the complete duplex path to be monitored at either end, or at any point along the path. Byte F2 is allocated for network provider communication purposes between STS path terminating elements.

Multiframe indicator byte H4 is used for VT structured payloads. It indicates a variety of different superframes for use by certain sub-STS-1 payloads. Bytes Z3 and Z4 are allocated for future and as yet undefined purposes. Byte Z5 is used for two purposes: tandem connection maintenance error count and a 32 kb/s path data communications channel.

Figure 2:
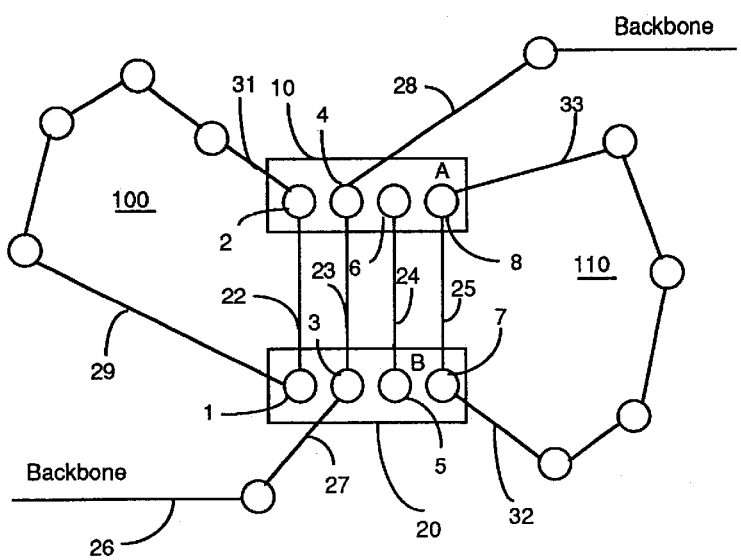
FIG. 2 illustrates an example of a network having a high capacity span between two sites (prior art)

FIG. 2 illustrates an example of a fiber optic network involving two sites, 10 and 20. In this example, NEs 2, 4, 6 and 8 at site 10 are respectively connected to NEs 1, 3, 5, 7 at site 20. NEs 1 and 2 may, for example, communicate with a ring 100, NEs 3 and 4, with a backbone linear system including spans 26, 27,23, and 28, while NEs 7 and 8 may be part of another ring 110. A local connection 24 is provided between NEs 5 and 6. There could be repeaters between the sites, not illustrated on FIG. 2. Each span 22,23,24 and 25 is a 4-fiber span for bidirectional, working and protection traffic, which results in 16 fibers being deployed between sites 10 and 20. As discussed above, the fiber count between rates 10 and 20 may be reduced using the WEM approach or the transparent transport solution according to the invention. A comparison between these two solutions follows.

Figure 3A:
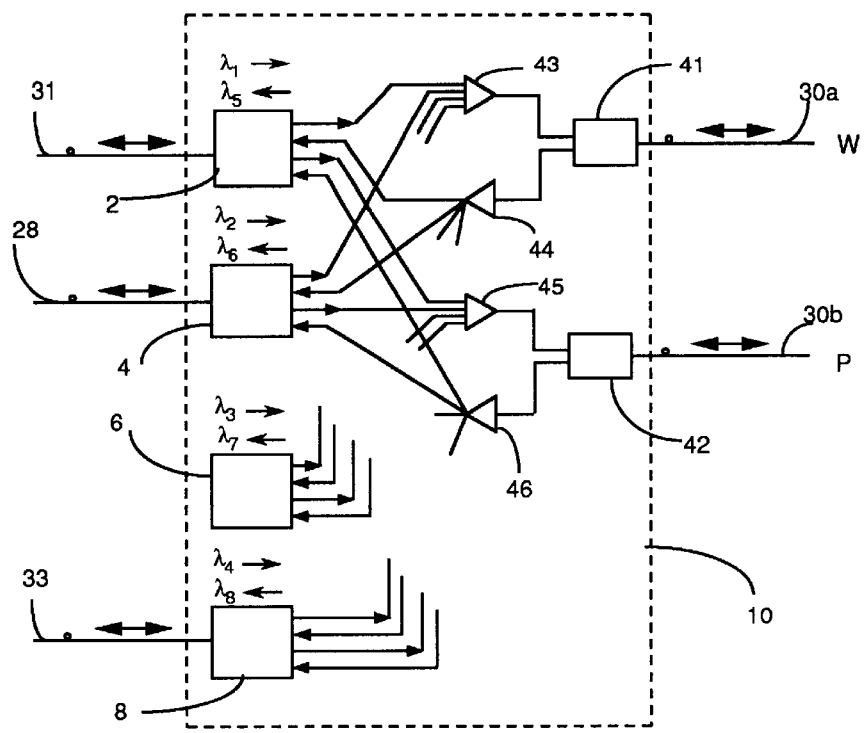
FIG. 3A illustrates the equipment necessary at site A of the network of FIG. 2, with the WDM approach to solving the per span fiber exhaust.

FIG. 3A shows the equipment necessary at site 10 (site A) of the network of FIG. 2 with the WDM approach where 8 channels $\lambda_1$ to $\lambda_8$ are transmitted over a two-fiber span 30a, 30b. Only the connections for nodes 2 and 4 are shown for simplification. Working signals of wavelengths $\lambda_1$ to $\lambda_4$ leave site 10 (forward direction), while working signals $\lambda_5$ to $\lambda_8$ arrive at site 10 from site 20 (reverse direction). Fiber 30a accommodates the working traffic, while fiber 30b accommodates the protection traffic. This arrangement requires four optical splitters/containers for reducing the fiber count from sixteen to four. Multi-wavelength splitter/combiner 43 consolidates the working forward traffic, multi-wavelength splitter/combiner 44, the working reverse traffic, splitter/combiner 45, the protection forward traffic and splitter/combiner 46, the protection reverse traffic. In addition, bidirectional couplers 41 and 42 are necessary to accommodate the bidirectional nature of the traffic.

Provision of all these coupler/splitters has inherent disadvantages; not only these are expensive pieces of equipment, they also attenuate the signal. Thus, the additional loss must be factored into link budget design. The loss could be compensated for by using a bidirectional 4-wavelength amplifier for each fiber span. Furthermore, for long inter-office spans, electrical regenerators may also be required with the associated couplers to split off/combine the individual wavelengths. This is illustrated in FIG. 3B.

Figure 3B:
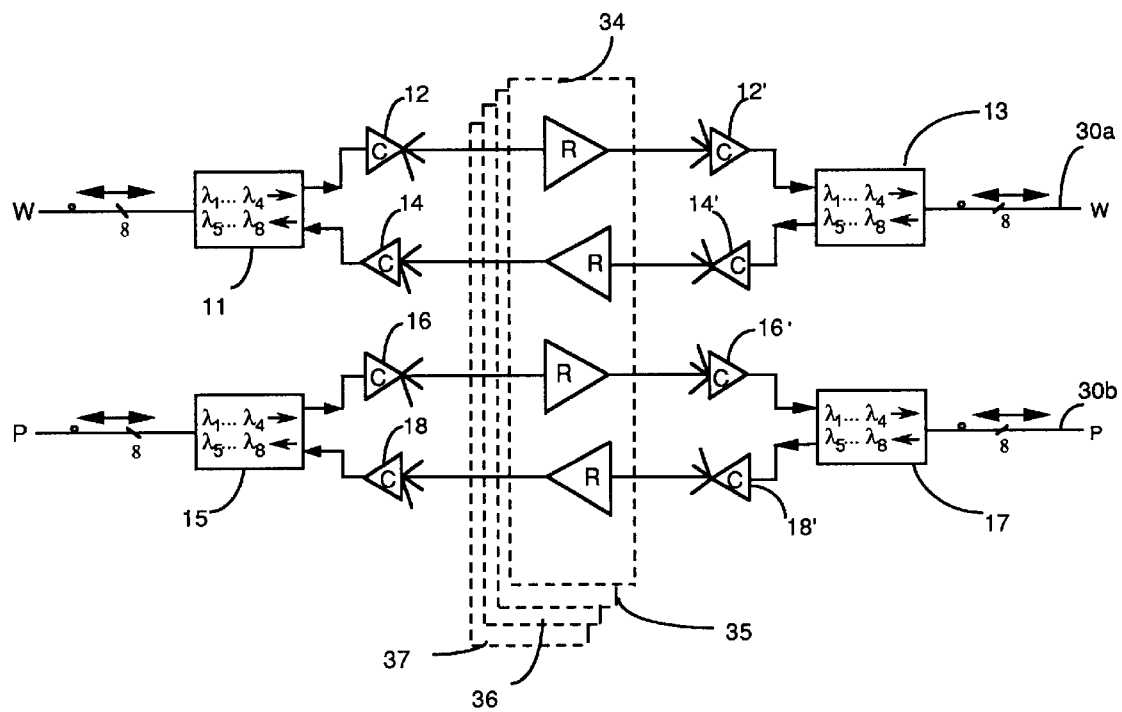
FIG. 3B illustrates an electrical regenerator in between sites A and B for the WDM approach.

FIG. 3B illustrates the regenerator site for the WDM approach, shown in FIG. 3A. For using only two fibers between sites 10 and 20, the channels must be separated before regeneration and re-assembled after. Thus, a bidirectional coupler 11 is necessary to separate the working forward and working reverse traffic. The working forward channels $\lambda_1$–$\lambda_4$ are then separated using multi-wavelength splitter/combiner 12, individually amplified by four regenerators 34–37, re-assembled after regeneration using multi-wavelength splitter/combiner 12', and combined with the reverse working traffic using coupler 13. Similar operations are performed for the working reverse traffic, using multi-wavelength splitter/combiners 14' and 14 before and after regeneration. An additional pair of bidirectional couplers 15, 17 is necessary for separating/combining the protection traffic for the forward and reverse directions. The protection forward channels are separated/re-assembled using multi-wavelength splitter/combiners 16 and 16', while the reverse protection channels are separated/combined using bidirectional couplers 18' and 18. Each protection channel is individually amplified by regenerators 34–37.

Finally, wavelength specific transmitters are required in each NE 2, 4, 6, and 8 of site 10 and 1, 3, 5 and 7 of site 20. These transmitters may not have been provided initially, and the existing transmitters would require upgrading.

Figure 4A:
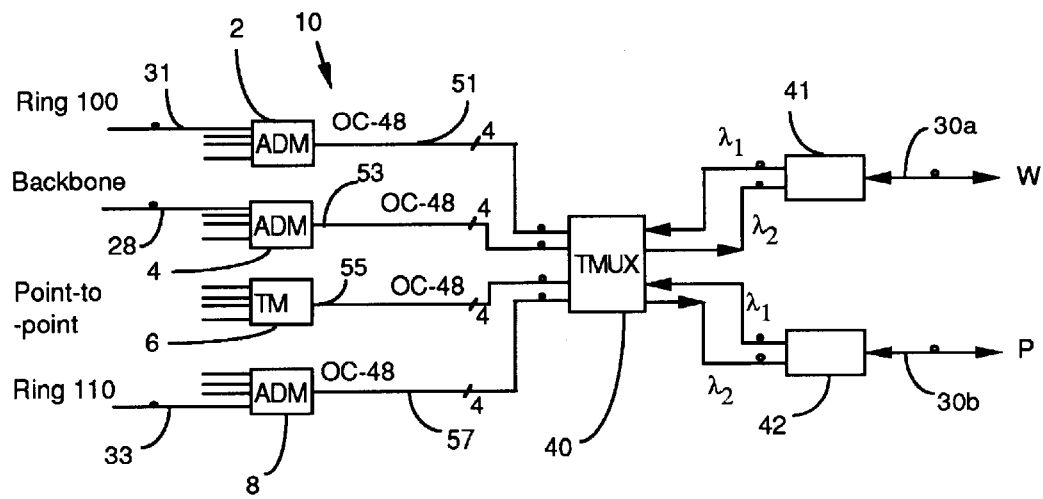
FIG. 4A shows the equipment necessary at site A of the network of FIG. 2, with a high rate mid-span according to the invention.

FIG. 4A shows the configuration according to the invention, where the four fiber spans 22–25 shown in FIG.

2 between the two sites 10 and 20 are replaced by a high rate span 30a, 30b. If each span 22–25 carries an OC-48, the high rate span 30 would carry traffic at OC-192 rate. As seen in connection with FIGS. 4A and 4B, bidirectional couplers 41 and 42 are still used to reduce the fiber count from four to two fibers. However, unlike the configuration of FIG. 3A, no multi-wavelength splitters/combiners are necessary at site A. Although wavelength specific OC-192 transmitters are required for providing the forward OC-192 channel $\lambda_F$ and reverse OC-192 channel $\lambda_R$, only one quarter as many are needed.

Figure 4B:
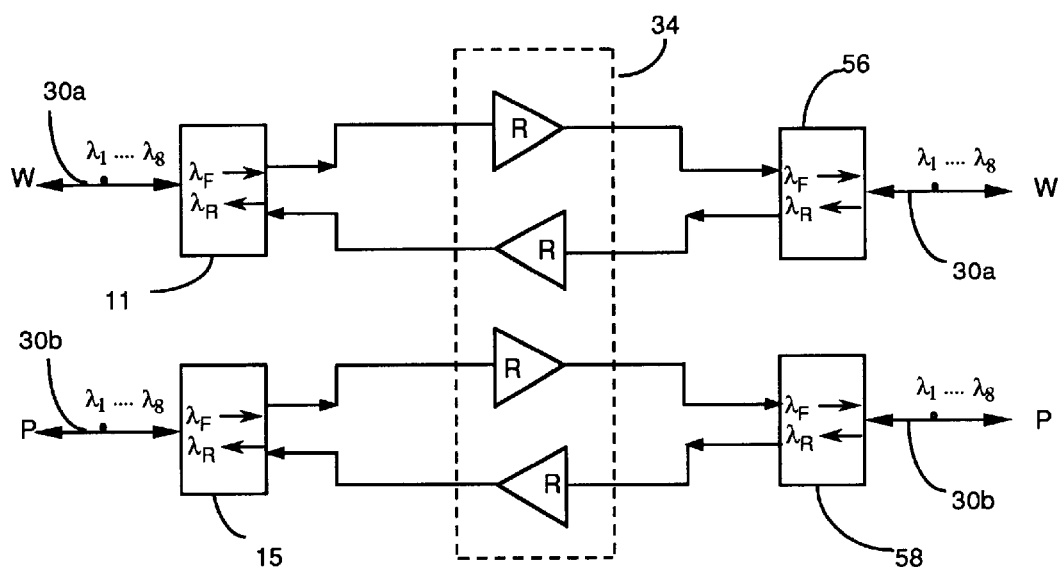
FIG. 4B illustrates an electrical regenerator in between sites A and B according to the invention.

FIG. 4B shows a configuration when regeneration of the high speed signal is necessary in the case of long inter-office spans. Unlike the case illustrated in FIG. 3B for the WDM approach, only one 2-channel bidirectional regenerator 34 is necessary, resulting also in further savings on couplers. Thus, at the regenerator site, the working forward and reverse channels are separated by a bidirectional coupler 11, and then combined by bidirectional coupler 13, couplers 15 and 17 being used in a similar way for regenerating the protection traffic. No splitter/combiner, such as 12, 14, 16, 18, 12', 14', 16' and 18' are needed.

It is to be understood that it is possible to carry transparently trib signals of different trib bit rates over the high rate span 30, the invention is not limited to identical trib bit rates. The input tribs described in this invention have the same rate for an easier understanding of the general concept. In addition, the invention is not limited to SONET signals, but it can be applied to other transport technologies. As well, the invention is not limited to OC-3/OC-12/OC-48 signals, carried in a OC-192 supercarrier, but it is also adaptable to other bit rates, in accordance with the HW and SW evolution of transport networks.

In order to act transparently for the signals travelling on the high-rate span 30, each site 10, 20 is equipped with a (TMux). FIG. 4A shows TMux 40 at site 10 connected to nodes 2,4, 6 and 8, T-Mux 50 (not shown) being provided at site 20 and connected to nodes 1, 3, 5 and 7. The TMuxs according to the invention allow for an unchanged operation of NEs 1 to 8 in the respective lower rate networks. For the forward direction, the signals input at site 10 are multiplexed by TMux 40 to a high rate signal (supercarrier) which is transmitted over optical fiber 30a, demultiplexed at site 20 by a corresponding TMux 50 (not shown in FIG. 4A), and output to the respective networks. Similar operations take place for the reverse channels and for the forward and reverse protection traffic.

As indicated above, the bytes of the trib TOH/POH are manipulated by the TMuxs such as to not alter the provisioning of the existing systems, to maintain the protection switching, to effect line maintenance signalling, section/line/path performance monitoring, and to provide sufficient performance information for fault isolation, as detailed next.

Protection Switching

In order to maintain protection switching of the existing systems, be they linear or ring, the APS bytes K1 and K2 of all tributary (trib) systems must be passed between sites 10 and 20 unaltered. Since the K2 byte is passed through, the line AIS and line RDI indications also pass through automatically.

Figure 5A:
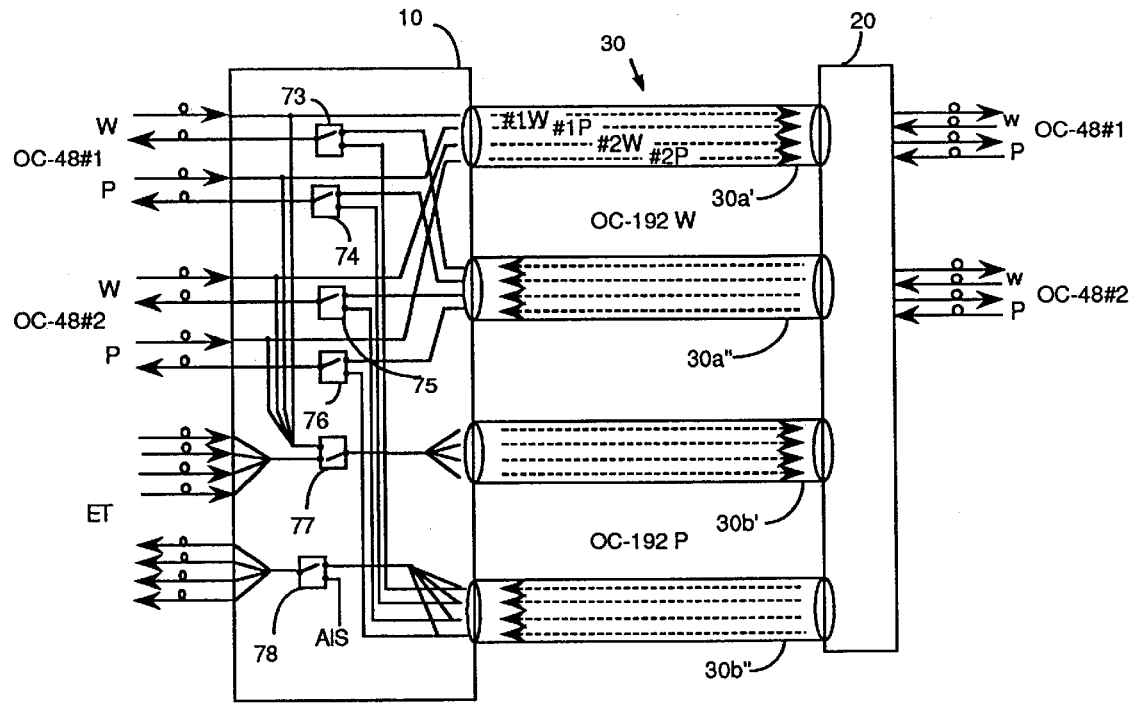
FIG. 5A illustrates the "W-channel" option for carrying OC-48 tributary systems transparently by the OC-192 super-carrier.

The routing options for providing trib protection depends on the trib protection scheme, which could be 1:N, 1+1 or 4F-BLSR, and 2F-BLSR.

a) For a 1:N trib system protection type, the protection channel may be best carried by including the trib P-channel over the OC-192 W-channel, by sacrificing some bandwidth, as shown in FIG. 5A. In this case, the working and protection forward channels received from nodes 2 and 4 are directed over fiber 30a', while the working and protection reverse channels received over fiber 30a" are directed to the respective network, as symbolically illustrated by switches 73 to 76. Protection fibers 30b' and 30b" are used for transporting extra-traffic (ET), switches 77, 78 illustrate the flow of extra-traffic (ET) for the respective forward/reverse directions between the sub-networks over fibers 30b', 30b".

Figure 5B:
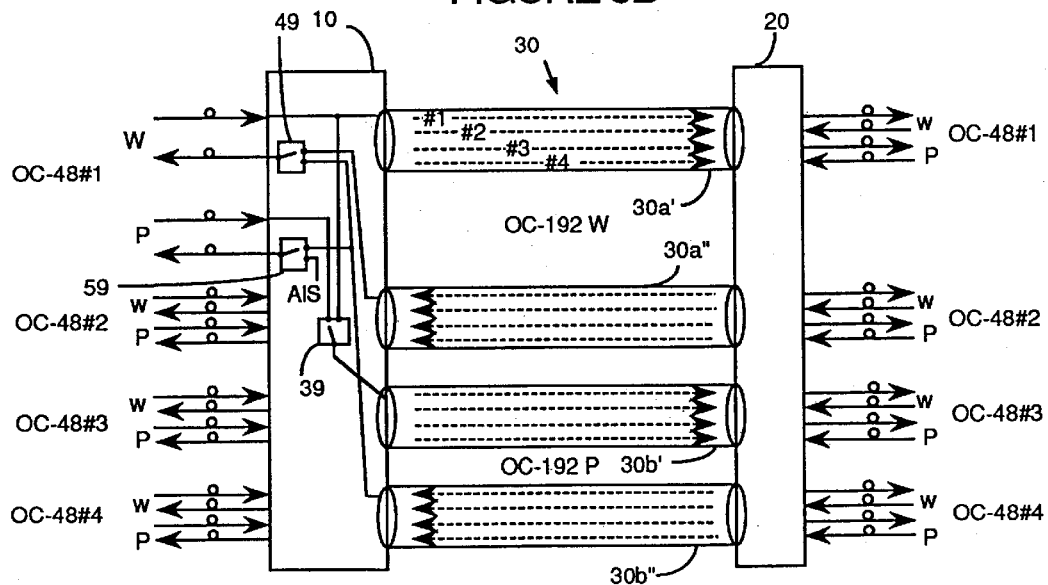
FIG. 5B illustrates the "Extra Traffic" option for carrying OC-48 tributary systems transparently by the OC-192 super-carrier.

An alternative solution is to carry each trib P-channel within the OC-192 P-channel as extra-traffic (ET), as shown in FIG. 5B. In this case, switches 39, 49 and 59 symbolically illustrate how the protection traffic is directed for this type of protection. Thus, it is apparent that the working forward channels input at nodes 2, 4, 6 and 8 from the respective sub-network are transported over fiber 30a' of the high-rate span 30. In the case of a protection switching, the affected incoming OC-48s would be transported over fiber 30b' of the high-rate span 30, as symbolized by switch 39. Switch 49 illustrates how the working reverse traffic received over fiber 30a" or over fiber 30b" is directed to the respective network, while switch 59 shows how the AIS information is added to the outgoing signal for the respective sub-network in the case when protection reverse traffic is received over fiber 30b" and 30.

Figure 5C:
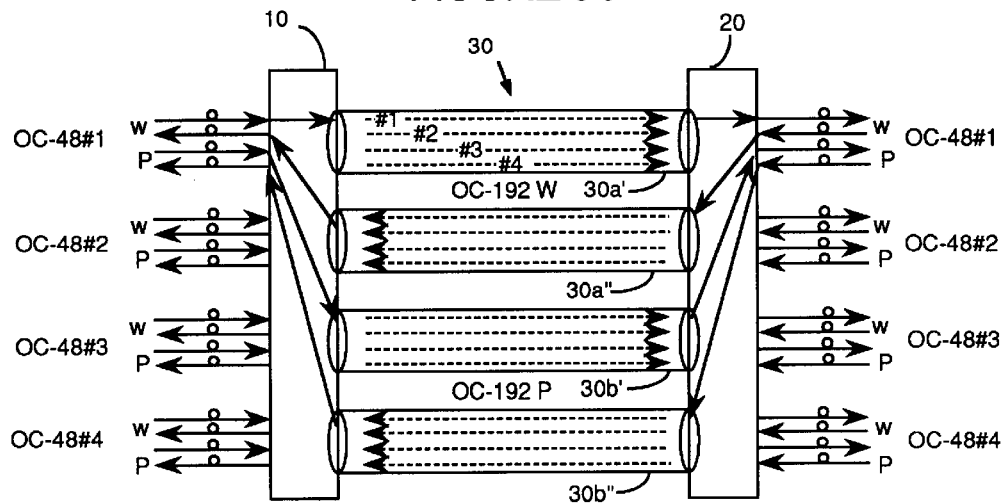
FIG. 5C illustrates the "nailed-up" option for carrying OC-48 tributary systems transparently by the OC-192 super-carrier.

However, in this type of routing, when an OC-192 protection switch occurs, the P-channel of the trib system will see a loss of continuity of its datacom and APS channels, raising undesired alarms.

b) For a 1+1 or a 4F-BLSR trib system protection type, the best solution is to carry the trib P-channel over a OC-192 P-channel without OC-192 protection switching enabled (hereinafter called the "nailed up" OC-192 option). In this arrangement, a failure of the OC-192 W-channel would trigger a span switch of all trib systems. As illustrated in FIG. 5C, the working channels for all OC-48 trib systems are carried in the forward direction, on the working (W) fiber 30a', and the working traffic in the reverse direction, is carried on W-fiber 30a", comprising the OC-192 W-channels. Similarly, the trib protection channels are carried in the forward direction over protection (P) fiber 30b' and in the reverse direction over P-fiber 30b", comprising the OC-192 P-channels.

The OC-192 W-channel and ET solutions above may also be used for a 1+1/4F-BLSR trib system protection type. The same disadvantage as indicated above applies to the ET solution, while the OC-192 W-channel solution results in more bandwidth sacrificed because of carrying the trib P-channel in a one-to-one ratio rather than a 1:N ratio.

c) For a 2F-BLSR trib system, the protection timeslots are interleaved with the working timeslots, and therefore the ET solution cannot be used. On the other hand, the trib W/P bandwidth can be carried within the OC-192 W-channel and OC-192 protection can be enabled without any operational issues. However, the most efficient approach for this trib system protection type is to carry the trib W/P bandwidth over nailed up OC-192 channels. Since the 2F-BLSR effects a ring switch when a span fails, both the OC-192 W and P channels can be loaded up with 2F-BLSRs.

The bandwidth available at the TMux should also be taken into consideration, as will be explained next. Table 1 indicates the protection 5 channel routing options and the results of protection action taken by the TMuxs for each case.

TABLE 1

Protection channel routing options/issues

| OC-48 trib system type | Trib P-channel treatment | All trib traffic protected if OC-192 W fails? | OC-192 line switch affect on trib systems | Max. trib W BW on OC-192 W | Max. trib PBW on OC-192P |
|---|---|---|---|---|---|
| 1:N | ET on OC-192 | Yes | P appears failed | 4×OC-48 | 1×OC-48 |
| | nailed-up OC-192 P | one trib only | N/A | 4×OC-48 | 1×OC-48 |
| | within OC-192 W | Yes | — | 3×OC-48 | N/A |
| 1 + 1 or 4F-BLSR | ET on OC-192 P | Yes | P appears failed | 4×OC-48 | 4×OC-48 |
| | nailed-up OC-192 P | Yes, tribspan switch | N/A | 4×OC-48 | 4×OC-48 |
| | within OC-192 W | Yes | — | 2×OC-48 | N/A |
| 2F-BLSR | trib P + W over nailed-up OC-192 P or W | Yes, tribring switch | N/A | 4×OC-48 2F-BLSR | 4×OC-48 2F-BLSR |
| | within OC-192 W | Yes | — | 4×OC-48 2F-BLSR | N/A |

Maintenance and Performance Monitoring

Figure 6:
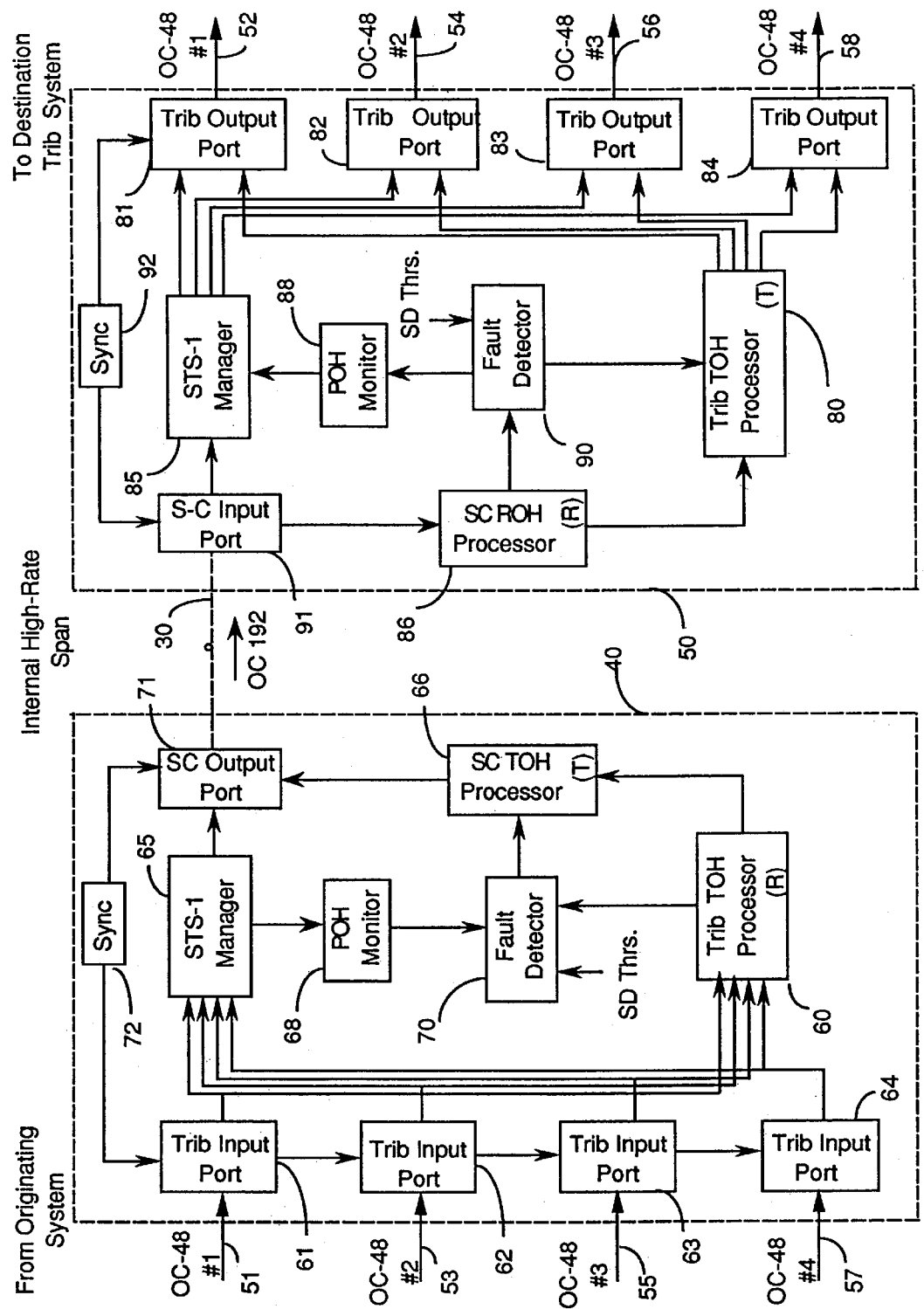
FIG. 6 is a block diagram of the transparent multiplexer/demultiplexer the "nailed up" OC-192 option.

FIG. 6 is a block diagram of the TMux illustrating the blocks involved in carrying four OC-48 trib systems over an OC-192 from input TMux 40 to output TMux 50, for the case of a nailed up OC-192 P-channel trib protection type. The operation for forward direction is illustrated and disclosed in the following for simplification, the T-Mux pair 40, 50 operates similarly for the reverse traffic.

TMux 40 comprises four trib input ports 61-64, each input port for receiving an incoming SONET formatted optical signal OC-48 #1–4 over a respective input span 51, 53, 55, and 57 and converting same to an input STS-48 #1–4. Trib input ports 61-64 perform SONET physical layer 5 operations, clock recovery/synthesis, descrambling, framing, manipulating the section overhead and the line overhead, demultiplexing the STS-48, and synchronization of the STS paths with the local clock provided by a synchronization unit 72, and transmitting the input STS-1s to a STS-1 manager 65.

A trib transport overhead (TOH) processor 60 receives the SOH and LOH bytes of all input STS-48s and processes these bytes according to Table 2.

TABLE 2

Trib TOH manipulation

| Byte name | Definition | Trib STS-1 | Manipulation |
|---|---|---|---|
| A1-2 | Framing | STS-1 #1 | Term. |
| J0 | Section Trace | STS-1 #1 | Term. |
| B1 | Section BIP-8 | STS-1 #1 | Term. |
| E1 | Orderwire | STS-1 #i | Passthru |
| F1 | User | STS-1 #1 | Passthru |
| D1-3 | Section Datacom | STS-1 #1 | Passthru |
| Z0 | Growth | STS-1 #2-48 | Term. |
| H1-3 | STS Path Pointer | all STSs | Processed |
| B2 | Line BIP-8 | all STS-1s | Term. |
| K1 | APS | STS-1 #1 | Passthru |
| K2 | APS | STS-1 #1 | Passthru |
| D4-12 | Line Datacom | STS-1 #1 | Passthru |
| S1 | Sync Msg | STS-1 #1 | Term. |
| Z1 | Growth | STSs #2 to 48 | Term. |
| Z2 | Growth | STS-1 #1–6, 8–48 | Term. |
| M1 | Line FEBE | STS #7 | Passthru |
| E2 | Order Wire | STS-1 # | Passthru |

The framing information in bytes A1–2 of the incoming signal must be terminated since there are many independent trib frame alignments but only one OC-192 frame alignment. Section trace byte J0, identifying the fibers, is also terminated, as it will be misleading to pass through this byte.

The section BIP-8 byte (B1) is terminated as usual, such that the TMux appears as a pseudo-repeater to facilitate fault isolation. However, any section errors that occur on the input span or internal span is replicated at the output span, as it will be disclosed later.

The section datacom bytes D1 to D3, along with bytes E1 (orderwire), and F1 (user byte) of all trib systems must be passed through the input and output TMuxs. Any potential mid-span meet problems encountered at the high speed Mux/trib interface regarding section DCC protocols are avoided by the TMux.

The line BIP-8 bytes are terminated. Again, any line errors which occur on an input span, for example span 51, or the internal span 30, is replicated at the output span, so that the trib systems can perform signal degraded (SD) protection switching as needed, and line performance monitoring.

The APS bytes are passed through transparently, as stated earlier, to enable normal protection operation on the tributary systems. Trib line AIS and RDI maintenance signals thereby pass through also. The line FEBE byte is passed through to enable normal performance monitoring.

The STS payload pointer bytes H1–H3 must be processed to still point to the SPE when the new frame alignment is imposed. Also, they must be manipulated for small frequency offsets via stuff/destuff operations.

The synchronization byte S1 must be terminated/sourced as it provides information about the timing source being used. Growth bytes Z0 to Z2 are undefined, thus they are terminated.

The line datacom bytes D4 to D12 and byte E2 (orderwire) of all trib systems must be passed through the input and output TMuxs. This action avoids any mid-span meet problems regarding line DCC protocols.

A POH monitor 68 accesses the POH of each trib system. The trib STS POH is passed through to comply with the definition of the transparency, however some of these bytes are monitored for faults and alarms, as shown in Table 3.

TABLE 3

Trib POH manipulation

| Byte name | Definition | Manipulation |
|---|---|---|
| J1 | Path Trace | Monitored |
| B3 | Path BIP-8 | Monitored |
| C2 | Signal Label | Monitored |
| G1 | Path Status | Monitored |

A fault detector 70 is provided for detecting errors on the input span and transmitting them to the far-end TMux, so that the trib systems detect errors appropriately. Fault detector unit 70 receives the BIP-8 bytes B1, B2 and B3, counts the section/line/path code violations (CV) for the trib systems, and performs comparisons with a provisioned line signal degrade (SD) threshold. Exceeding the threshold constitutes an SD in protection terminology. This information is passed to a transmit supercarrier TOH processor (SC TOHP) 66, which generates a TMux message (TMux Msg) comprising four bytes, one to indicate the bit error rate (BER) of each input span. The TMux Msg byte is inserted in the K2 timeslot of STS-1 #9 of each trib system. The fault detector 70 also monitors each tributary input for hard failure, and if detected, triggers line AIS insertion over the trib signal portion of the OC-192 SC.

A possible TMux Msg byte assignment is given in Table 4, together with the rate of uniformly distributed Line CVs for a given BER at OC-48 rate.

TABLE 4

TMux Msg Byte

| Code (hex) | Indication (raw BER) | Rate of Line CVs |
|---|---|---|
| 00 | unmeasurable BER | |
| 01 | BER<1E-12 | |
| 02 | BER~1E-12 | 1 CV every 3,215,021 frames |
| 03 | BER~5E-12 | 1 CV every 643,004 frames |
| 04 | BER~1E-11 | 1 CV every 321,502 frames |
| 05 | BER~5E-11 | 1 CV every 64,300 frames |
| 06 | BER~1E-10 | 1 CV every 32,150 frames |
| 07 | BER~5E-10 | 1 CV every 6,430 frames |
| 08 | BER~1E-09 | 1 CV every 3215 frames |
| 09 | BER~SE-09 | 1 CV every 643 frames |
| 0A | BER~1E-08 | 1 CV every 322 frames |
| 0B | BER~5E-08 | 1 CV every 64 frames |
| 0C | BER~1E-07 | 1 CV every 32 frames |
| 0D | BER~5E-07 | 1 CV every 6 frames |
| 0E | BER~1E-06 | 1 CV every 3 frames |
| 0F | BER~5E-06 | 2 CVs/frame |
| 10 | BER~1E-05 | 3 CVs/frame |
| 11 | BER~5E-05 | 16 CVs/frame |
| 12 | BER~1E-04 | 31 CVs/frame |
| 13 | BER~5E-04 | 156 CVs/frame |
| 14 | BER~1E-03 | 311 CVs/frame |
| FF | Line AIS | |

STS-1 manager unit 65 is responsible with interchanging the STS-1s from the tributaries, in order to permit the use of the SC TOH in STS-1#1. Tables 5 and 6 illustrate by way of an example how the STS-1s of OC-48/OC12/OC-3 trib systems are arranged in the OC-192 supercarrier.

TABLE 5

| Input OC-48 Trib # | Corresponding STS-1# on OC-192 Line for OC-48 Trib TOH |
|---|---|
| 1 | 13 |
| 2 | 49 |
| 3 | 97 |
| 4 | 145 |

TABLE 6

| Input OC-1213 Trib # | Corresponding STS-1 # on OC-192 Line for OC-12/3 Trib TOH |
|---|---|
| (1) (unequipped) | — |
| 2 | 13 |
| 3 | 25 |
| 4 | 37 |
| 5 | 46 |
| 6 | 61 |
| 7 | 73 |
| 8 | 85 |
| 9 | 97 |
| 10 | 109 |
| 11 | 121 |
| 12 | 133 |
| 13 | 145 |
| 14 | 157 |
| 15 | 169 |
| 16 | 181 |

Figure 7A:
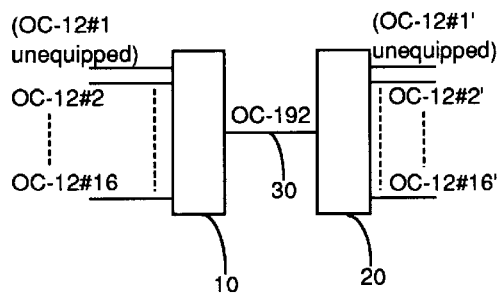
FIG. 7A illustrates how OC-12 tributary systems are carried transparently by an OC-192 super-carrier.
Figure 7B:
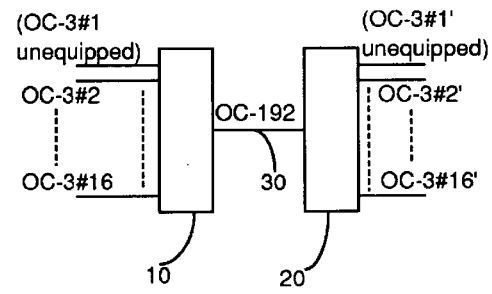
FIG. 7B illustrates how OC-3 tributary systems are carried transparently by an OC-192 super-carrier.

Thus, for the OC-48 trib scenario, the OC-48 trib feed whose STS-1#1 would coincide with SC STS-1#1 is swapped in entirety (both the OH and the payload) with STS-1#13 (or any STS-1 not normally carrying TOH). For OC-3 or OC-12 tribs, the trib whose STS-1#1 would coincide with OC-192 STS-1#1 is not supported in the TMux. Thus, a maximum of 15 OC-12 tribs are supported. FIG. 7A illustrates how OC-12 tributary systems are carried transparently by an OC-192 SC, while FIG. 7B shows OC-3 tributries.

The SC TOHP 66 passes the trib TOH bytes from block 60 and aligns each byte into the correct timeslot before passing same to a supercarrier (SC) output port 71. STS-1 manager 65 routes the 4×48 component STS-1s received from the respective trib input port to SC output port 71 for multiplexing the STS-1s into the output supercarrier.

The SC output port 71 receives the output STS-1s from block 65 and the SC TOH from SC TOHP 66, multiplexes the STS-1s into the supercarrier STS-192, adds the SC TOH, and is also responsible for scrambling, converting the output STS-192 to the optical supercarrier OC-192, and transmitting it on fiber 30. The SC output port 71 also performs clock synthesis based on the local clock from synchronization unit 72.

An SC input port 91 at output TMux 50 receives the optical supercarrier OC-192 on fiber span 30 and converts it to an input STS-192. SC input port 91 performs SONET physical layer operations, clock recovery/synthesis, descrambling, stripping the SC TOH, demultiplexing, synchronization of the STS paths with the local clock provided by a synchronization unit 92, and transmitting the incoming STS-1s to a STS-1 manager 85.

An SC receive overhead processor (SC ROHP) 86 receives the respective SOH and LOH bytes of the SC TOH and passes the trib TOH to trib TOH processor (TOHP) 80. The trib TOH processor 80 extracts the TMux Msg bytes. Using a look-up table, each TMux value indicates the rate of errors that must be replicated on the outgoing trib signal. The errors are introduced by appropriately inverting B1 and B2 values. The remaining trib TOH is either passed through or generated, as in Table 2.

A POH monitor 88 accesses the POH bytes, but again, leaves them unchanged. These bytes are only monitored for faults and alarms, as shown in Table 3.

A fault detector 90 monitors the OC-192 SC TOH for B2 errors and passes this count to the trib TOH processor 80, which incorporates the OC-192 errors into the corrupted B1 and B2 values sent to each trib output port. For a hard failure on the OC-192 SC, the fault detector triggers the insertion of line AIS on all output tribs via the trib TOH processor.

STS-1 manager 85 routes the component STS-1s of the supercarrier to a respective output port 81–84 for multiplexing the STS-1s into the outgoing OC-48s. STS-1 manager 85 also swaps STS-1 #13 back to STS-1 #1, or as the case may be for other granularity of input tributaries. A destination trib system receives its respective OC-48 through one of the four trib output ports 81–84. Each trib output port 81–84 is responsible for receiving the outgoing STS-1s from block 85, multiplexing the STS-1s into an output STS-48, adding the trib TOH received from block 80, scrambling, converting the STS-48 signal to the respective outgoing optical signal OC-48, and transmitting it on the respective output span. The trib output ports also perform clock synthesis based on the local clock of synchronization unit 92.

Since E1–2, F1 and D1–D12 bytes of the originating trib systems are passed through transparently, there is no access to the trib orderwire (OW), user and datacom channels from a TMux. However, since each TMux is co-located with the trib systems, as seen for example on FIG. 4A, each originating trib system 2, 4, 6, and 8 can access its own OWs, user, and datacom channel. Access to the OC-192 E1–2, F1 and D1–D12 bytes is supported by the TMuxs.

The J0 section trace bytes from the original trib systems could be regenerated at the output TMux trib outputs so that the downstream trib systems still see the same J0s and do not need to change their provisioning.

The supported trib rates/quantities are four OC-48, 15 OC-12 or 15 OC-3. The OC-12 or OC-3 trib whose STS-1 #1 would correspond to STS-1 #1 on the OC-192 line is not supported to avoid TOH conflicts.

Fault Isolation

The interaction between TMuxs 40 and 50 and the trib systems in response to line degrades and failures is described next in connection with FIG. 6, for the case of the nailed up OC-192 option.

As indicated above, the TMux must replicate signal fail (SF) and signal degrade (SD) conditions which occur on the input span and internal span, at the output span, so that the trib systems may perform protection switching as needed, and performance monitoring.

Both line RDI (remote defect indication) message and the line FEBE (far end block error) byte M1 for each trib are passed through the TMux span, so that proper maintenance signalling can be performed.

(a) Forward span reaction to line degrade.

When a line degrade condition occurs on either the tributary input span or the OC-192 internal span, the output TMux trib must corrupt the B2s such that the combined BER of the tributary input span and the OC-192 internal span is mimicked. This will ensure that the downstream trib system could initiate an SD level protection switch if needed. The B1s must also be corrupted to provide consistent performance monitoring counts.

(i) A line degrade condition on the input span 51 is alarmed at TMux 40, and fault detector 70 counts the line code violations (CVs). A TMux Msg byte is generated in block 66 to indicate the bit error rate (BER) of the input span 51. The line error counting and TMux Msg byte generation occur always, regardless of whether or not the BER has crossed the SD threshold. No protection action is taken by TMux 40.

TMux 50 receives a clean OC-192 line from TMux 40, however it counts path CVs at the path layer of the corresponding trib with detector 90, and path SD alarms might be raised. The TMux Msg byte is extracted and a BER is generated via block 80 on the corresponding output span 52 to mimic the BER on the affected input span. The destination trib receives a degraded line from TMux 50. In response, it counts line code violations. It could potentially raise a line SD alarm and initiate protection switching, namely send a K1 request back to the input trib system.

(ii) A line degrade condition on the internal span 30 is also alarmed at the output TMux 50. Fault detector 90 passes the line error count to block 80 which generates the appropriate BERs for the output spans 52, 54, 56 and 58. Each destination trib system reacts individually.

Since in practice simultaneous degrades may appear on one or more input spans and the internal span, the actual operation of the TMux is a combination of the above two scenarios. The trib TOH processor then sums the BER from the OC-192 line with the BER indicated by each TMux Msg byte extracted locally from each trib signal. The resultant BER is replicated on each outgoing span 52, 54, 56 and 58.

(b) Reverse Span Reaction to line degrade.

A degrade on the input span 51 triggers Line FEBE counts to be sent back by the respective destination trib system connected over span 52 to output TMux 50.

A degrade on the internal span 30 triggers the Line FEBE counts to be sent back by all destination trib systems.

For the combined case of a degrade on an input span and a degrade on the internal span, the Line FEBE counts sent back correspond to the combined degrade.

(c) Forward Span Reaction to line failure (SF).

When a line failure condition occurs on either tributary input span 51, 53, 55, or 57, or the internal span 30, the output TMux trib output must send Line Alarm Inhibit Signal (AIS). This will ensure that the downstream trib system will initiate protection.

(i) An SF condition on the input spans 51, 53, 55 and 57 is alarmed at the input TMux 40 and the destination systems. The destination trib systems report the SF as being due to line AIS, as this is generated by the input TMux 40. Only the input TMux reports the correct cause of the SF. This alarm reporting action is similar to that of a regenerator.

If the SF is due to a loss of frame (LOF), input TMux 40 counts Severely Errored Frame Seconds-Section, Errored Seconds-Section and Severely Errored Seconds-Section. Input TMux 40 inserts the line AIS over the affected trib bandwidth. This automatically results in setting path AIS. Any path layer alarm is inhibited by the higher layer failure.

Output TMux 50 receives a clean OC-192 line from input TMux 40. At the path layer, TMux 50 raises STS path AIS alarms on the affected paths and counts Unavailable Seconds-Path and Failure Counts-Path, on the affected paths. The embedded trib Line AIS is passed out the trib output port as usual line AIS.

The downstream trib system raises a Line AIS alarm and counts Severely Errored Frame Seconds-Section, Errored Seconds-Section, Severely Errored Seconds-Section, etc., and initiates protection switching, namely it sends the K1 byte request back towards the input trib system.

(ii) An SF on the internal span 30 would be alarmed at the output TMux 50 and all destination trib systems.

If there are simultaneous SFs on one or more input spans and the internal span, the system reaction is a combination of the two scenarios above.

(d) Reverse Span Reaction to line failure (SF).

An SF condition on the input span triggers Line RDI to be sent back by the destination trib system. An SF on the internal span triggers the Line RDI to be sent back by all the destination trib systems.

For the combined case of an SF on an input span and an SF on the internal span, line RDI is sent back by all the destination trib systems. The SF on the input span is not silent, input TMux 40 alarms it. For the combined case of an SD on the input span and an SF on the internal span, Line RDI is sent back by all destination trib systems. Again, the SD on the input span is not silent, input TMux 40 alarms it.

For the combined case of an SF on the input span and an SD on the internal span, Line RDI is sent back by the respective destination trib system and Line FEBEs are counted by the other destination trib systems.

While the invention has been described with reference to particular example embodiments, further modifications and improvements which will occur to those skilled in the art, may be made within the purview of the appended claims, without departing from the scope of the invention in its broader aspect.

We claim:

1. In a plurality of trib networks having in common a first and a second site, a method for transporting a corresponding plurality of trib signals over a high rate span between said first and said second site, comprising the steps of:

at said first site, connecting a plurality (K) of trib input ports each port to receive a trib input signal from a corresponding trib network over a trib channel;

transparently multiplexing all said trib input signals into a supercarrier signal of a high bit rate, said supercarrier signal comprising operation, administration, maintenance and provisioning (OAM&P) information on all said trib input signals and OAM&P information on said supercarrier signal; and connecting a supercarrier output port to said high bit rate span for transmitting said supercarrier signal over a supercarrier channel, wherein said trib signals remain unchanged on the said trib networks.

2. A method as claimed in claim 1, wherein the bit rate of said supercarrier signal is at least equal to the sum of the bit rates of all said trib signals.

3. A method for transporting a plurality (K) of trib signals over a high bit rate span, comprising the steps of:

connecting a supercarrier input port to said high rate span for receiving a supercarrier signal over a supercarrier channel;

transparently demultiplexing said supercarrier signal into a plurality (K) of trib output signals, each said trib output signal comprising OAM&P information on said trib output signal and OAM&P information on said supercarrier signal; and connecting a plurality (K) of trib Output ports to a corresponding plurality (K) of trib networks, each trib output for transmitting a trib output signal over a corresponding trib channel.

4. A method as claimed in claim 3, wherein the bit rate of said supercarrier is at least equal to the sum of the bit rates of all said trib signals.

5. A method for transporting a plurality (K) of trib signals over a high rate span, comprising the steps of:

at a first site, connecting a plurality (K) of trib input ports to a corresponding plurality (K) of trib networks, each trib input port for receiving a trib signal from a corresponding trib network;

transparently multiplexing all said trib signals into a supercarrier signal of a high bit rate, said supercarrier signal comprising OAM&P information on all said trib signals and OAM&P in formation on said supercarrier signal;

connecting a supercarrier output port to said high rate span for transmitting said supercarrier signal to a second site;

at said second site, connecting a supercarrier input port to said supercarrier channel for receiving said supercarrier signal;

transparently demultiplexing said supercarrier signal into said plurality (K) of trib signals, each said trib signal comprising said OAM&P information on said respective trib signal and OAM&P information on said supercarrier signal; and connecting a plurality (K) of trib output ports to a corresponding plurality (K) of trib networks, each trib output port for transmitting a respective trib signal over said corresponding trib network.

6. In a plurality (K) of tributary networks, each trib network for transporting trib signals between a multitude of sites with protection switching capabilities, said trib networks having in common a first and a second site, a method for carrying all said trib signals between said first and said second site over a high rate span, with no change to the provisioning of said trib networks, said method comprising, at any of said first or said second site, the steps of:

providing a corresponding plurality (K) of trib ports and connecting each said trib port to a corresponding trib network over an associated forward working (FW) trib channel, an associated forward protection (FP) trib channel, an associated reverse working (RW) trib channel and reverse protection (RP) trib channel;

providing a supercarrier port and connecting same to said a high speed span over a FW, a FP, a RW and a RP supercarrier channel;

receiving at each trib port, from said corresponding trib network, a FW trib signal over said associated FW trib channel, and a FP trib signal over said associated FP trib channel;

transparently multiplexing all said trib FW signals into a FW supercarrier signal comprising OAM&P information on all said FW trib signals and OAM&P information on said FW supercarrier signal; and transparently multiplexing all said FP trib signals into a FP supercarrier signal comprising OAM&P information on all said FP trib signals and OAM&P information on said FP supercarrier signal.

7. A method as claimed in claim 6, further comprising the step of, at said supercarrier port, transmitting said FW supercarrier signal over said FW supercarrier channel and transmitting said FP supercarrier signal over said FP supercarrier channel.

8. A method as claimed in claim 7, further comprising the steps of:

receiving, at said supercarrier port, one of a RW supercarrier signal over said RW supercarrier channel and a RP supercarrier signal over said RP supercarrier channel;

transparently de-multiplexing said RW supercarrier signal into a plurality of RW trib signals, each comprising OAM&P information on said respective RW trib signals and OAM&P information on said RW supercarrier signal;

transparently de-multiplexing said RP supercarrier signal into a plurality of RP trib signals, each comprising OAM&P information on said respective RP trib signal and OAM&P information on said RP supercarrier signal;

transmitting, from each said trib port, each said respective RW trib signal over said respective RW trib channel and each said respective RP trib signal over said RP associated trib channel.

9. In a plurality (K) of tributary networks, each trib network for transporting trib signals between a multitude of sites with protection switching capabilities, said trib networks having in common a first and a second site, a method for carrying all said trib signals between said first and said second site over a high rate span, with no change to the provisioning of said trib networks, said method comprising, at any of said first or said second site, the steps of:

providing a corresponding plurality (K) of trib ports and connecting each said trib port to an associated trib network over an associated FW trib channel, an associated FP trib channel, an associated RW trib channel, and an associated RP trib channel;

providing a supercarrier port and connecting same to said a high speed span over a FW, a FP, a RW, and a RP supercarrier channel;

receiving at each said trib port, from said corresponding trib network, a FW trib signal over said associated FW trib channel and a FP trib signal over said associated FP trib channel; and transparently multiplexing all said trib FW and PW signals into a forward supercarrier signal comprising OAM&P information on all said FW and PW trib signals and OAM&P information on said forward supercarrier signal.

10. A method as claimed in claim 9, further comprising the steps of:

providing an additional trib port for multiplexing incoming extra-traffic (ET) signals into a forward ET signal;

determining a transmission error parameter for said FW channel;

transmitting said forward supercarrier over said FW supercarrier channel and transmitting said forward ET signal over said FP supercarrier channel whenever said transmission error parameter is less than a threshold; and transmitting said forward supercarrier signal over said FP supercarrier channel and dropping said forward ET signal, whenever said transmission error parameter is higher than said threshold.

11. A method as claimed in claim 10, further comprising the steps of:

receiving at said supercarrier port a reverse signal over one of said RW supercarrier channel and said RP supercarrier channel;

transparently de-multiplexing said reverse signal into a plurality of RW trib signals and a plurality of RP trib signals, each comprising OAM&P information on said respective trib signal and OAM&P information on said reverse supercarrier signal; and transmitting each said RW and RP trib signals over said associated RW and RP trib channels.

12. A method as claimed in claim 11, further comprising the steps of:

determining if said reverse signal received over said RP supercarrier channel comprises a reverse ET signal; and demultiplexing, at said additional trib port, said reverse ET signal into a plurality of outgoing ET signals.

13. A method as claimed in claim 6, further comprising the steps of:

determining a transmission error parameter for said FW channel;

transmitting, from said supercarrier port, said FW supercarrier signal over said FW supercarrier channel and said FP supercarrier signal over said FP supercarrier channel as extra-traffic, whenever said transmission error parameter is less than a threshold; and transmitting said FW supercarrier signal over said FP supercarrier channel, whenever said transmission quality parameter is higher than said threshold.

14. A method as claimed in claim 13, further comprising the steps of:

receiving at said supercarrier port a RW supercarrier signal over said RW supercarrier channel and a RP supercarrier signal over said RP supercarrier signal;

transparently de-multiplexing said RW supercarrier signal into a plurality of RW trib signals, each comprising OAM&P information on said respective trib signal and OAM&P information on said RW supercarrier signal;

transparently de-multiplexing said RP supercarrier signal into a plurality of RP trib signals, each comprising OAM&P information on said respective trib signal and OAM&P information on said RP supercarrier signal; and transmitting each said RW and RP trib signals over said respective RW and RP trib channels.

15. A method for transparently transporting a plurality (K) of trib signals between a first and a second site over a high rate span, a trib signal arriving at said first site from an associated trib network over an associated input span (ISk) and being returned to said associated trib network at said second site over an output span (OSk), said method comprising the steps of:

at said first site, connecting all said $IS_k$ to a first transparent multiplexer/demultiplexer (T-Mux) and connecting said T-Mux to said high rate span, for transparently multiplexing all said (K) trib signals into a supercarrier signal of a high bit rate, said supercarrier signal comprising operation, administration, maintenance and provisioning (OAM&P) information on all said trib input signals and OAM&P information on said supercarrier signal;

at said second site, connecting said high rate span to a second T-Mux and connecting said second T-Mux to all said $OS_k$ for transparently demultiplexing said supercarrier signal into said (K) trib signals, each said trib signal comprising OAM&P information on said trib output signal and OAM&P information on said supercarrier signal.

16. A method as claimed in claim 15, further comprising the steps of:

alarming a signal fail (SF) condition on any $IS_k$ at said first T-Mux by generating a line alarm inhibit signal (AIS) and inserting same in said OAM&P information of said associated $OS_k$; and initiating a protection switching protocol at said $OS_k$ upon detection of said line AIS.

17. A method as claimed in claim 15, further comprising the step of alarming a SF condition on said high rate span at said second T-Mux and all said $OS_k$.

18. A method as claimed in claim 15, further comprising the steps of alarming a SF condition on said high rate span and on any of said $IS_k$, by all said $OS_k$.

* * * * *